(12) United States Patent
Mukumoto et al.

(10) Patent No.: US 11,175,016 B2
(45) Date of Patent: Nov. 16, 2021

(54) PLANAR ILLUMINATION DEVICE WITH SPACER BETWEEN LENS AND DIFFUSER

(71) Applicant: MINEBEA MITSUMI Inc., Nagano (JP)

(72) Inventors: Suguru Mukumoto, Nagano (JP); Tomoaki Morishita, Nagano (JP); Ginga Ito, Nagano (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 17/268,625

(22) PCT Filed: Sep. 6, 2019

(86) PCT No.: PCT/JP2019/035154
§ 371 (c)(1),
(2) Date: Feb. 16, 2021

(87) PCT Pub. No.: WO2020/054602
PCT Pub. Date: Mar. 19, 2020

(65) Prior Publication Data
US 2021/0190294 A1    Jun. 24, 2021

(30) Foreign Application Priority Data
Sep. 13, 2018 (JP) .............................. JP2018-171227

(51) Int. Cl.
*F21V 13/04* (2006.01)
*F21V 5/04* (2006.01)
(Continued)

(52) U.S. Cl.
CPC ................ *F21V 13/04* (2013.01); *F21V 5/04* (2013.01); *F21V 7/05* (2013.01);
(Continued)

(58) Field of Classification Search
CPC ... F21V 13/04; F21V 5/04; F21V 7/05; G02F 1/133602; G02F 1/133607; G02F 1/133608
See application file for complete search history.

(56) References Cited

U.S. PATENT DOCUMENTS 9,757,924 B2 * 9/2017 Park .................... B32B 27/08
2003/0214720 A1 * 11/2003 Bourdelais ........... G02B 6/0051
                                                                359/599
(Continued)

FOREIGN PATENT DOCUMENTS

CN    102278704 A    12/2011
CN    202216110 U     5/2012
(Continued)

OTHER PUBLICATIONS

International Search Report for corresponding International Application No. PCT/JP2019/035154 dated Oct. 21, 2019.
(Continued)

*Primary Examiner* — Rajarshi Chakraborty
*Assistant Examiner* — Michael Chiang
(74) *Attorney, Agent, or Firm* — Pearne & Gordon LLP

(57) ABSTRACT

A planar illumination device includes a light source substrate, a lens, a diffuser, and a spacer. The light source substrate includes a plurality of light-emitting devices two-dimensionally arrayed thereon. The lens receives light emitted from the light source substrate. The diffuser receives light emitted from the lens. The spacer is integrated with the diffuser and disposed between the lens and the diffuser.

9 Claims, 11 Drawing Sheets

(51) Int. Cl.
*F21V 7/05* (2006.01)
*G02F 1/1335* (2006.01)
*G02F 1/13357* (2006.01)
*F21Y 115/10* (2016.01)

(52) U.S. Cl.
CPC .. *G02F 1/133607* (2021.01); *G02F 1/133608* (2013.01); *F21Y 2115/10* (2016.08)

(56) References Cited

U.S. PATENT DOCUMENTS

| | | | | |
|---|---|---|---|---|
| 2004/0080938 | A1* | 4/2004 | Holman | G02F 1/133605 |
| | | | | 362/231 |
| 2011/0051044 | A1* | 3/2011 | Segawa | G02B 5/0278 |
| | | | | 349/64 |
| 2013/0148329 | A1 | 6/2013 | Zhou et al. | |
| 2015/0138781 | A1* | 5/2015 | Cho | G02B 5/0242 |
| | | | | 362/339 |
| 2015/0346551 | A1 | 12/2015 | Sun et al. | |
| 2018/0036997 | A1* | 2/2018 | Shimizu | G02B 6/0088 |
| 2020/0096821 | A1* | 3/2020 | Kyoukane | G02F 1/133603 |

FOREIGN PATENT DOCUMENTS

| | | |
|---|---|---|
| CN | 103712128 A | 4/2014 |
| CN | 107797356 A | 3/2018 |
| JP | 2010-061028 A | 3/2010 |
| JP | 2011-053543 A | 3/2011 |
| JP | 2018-106971 A | 7/2018 |
| JP | 2018-106973 A | 7/2018 |
| WO | 2013/008797 A1 | 1/2013 |

OTHER PUBLICATIONS

Written Opinion for corresponding International Application No. PCT/JP2019/035154 dated Oct. 21, 2019.
PCT/IPEA/416 and PCT/IPEA/409 International Preliminary Report on Patentability for corresponding International Application No. PCT/JP2019/035154 dated Feb. 19, 2020.
International Preliminary Report on Patentability for corresponding International Application No. PCT/JP2019/035154 dated Feb. 19, 2020 and English translation.
Decision to Grant a Patent for corresponding Japanese Application No. 2020-545985 dated Dec. 2, 2020 and English translation.
Chinese Office Action dated Jun. 18, 2021 for corresponding Chinese Application No. 201980055684.6 and English translation.

* cited by examiner

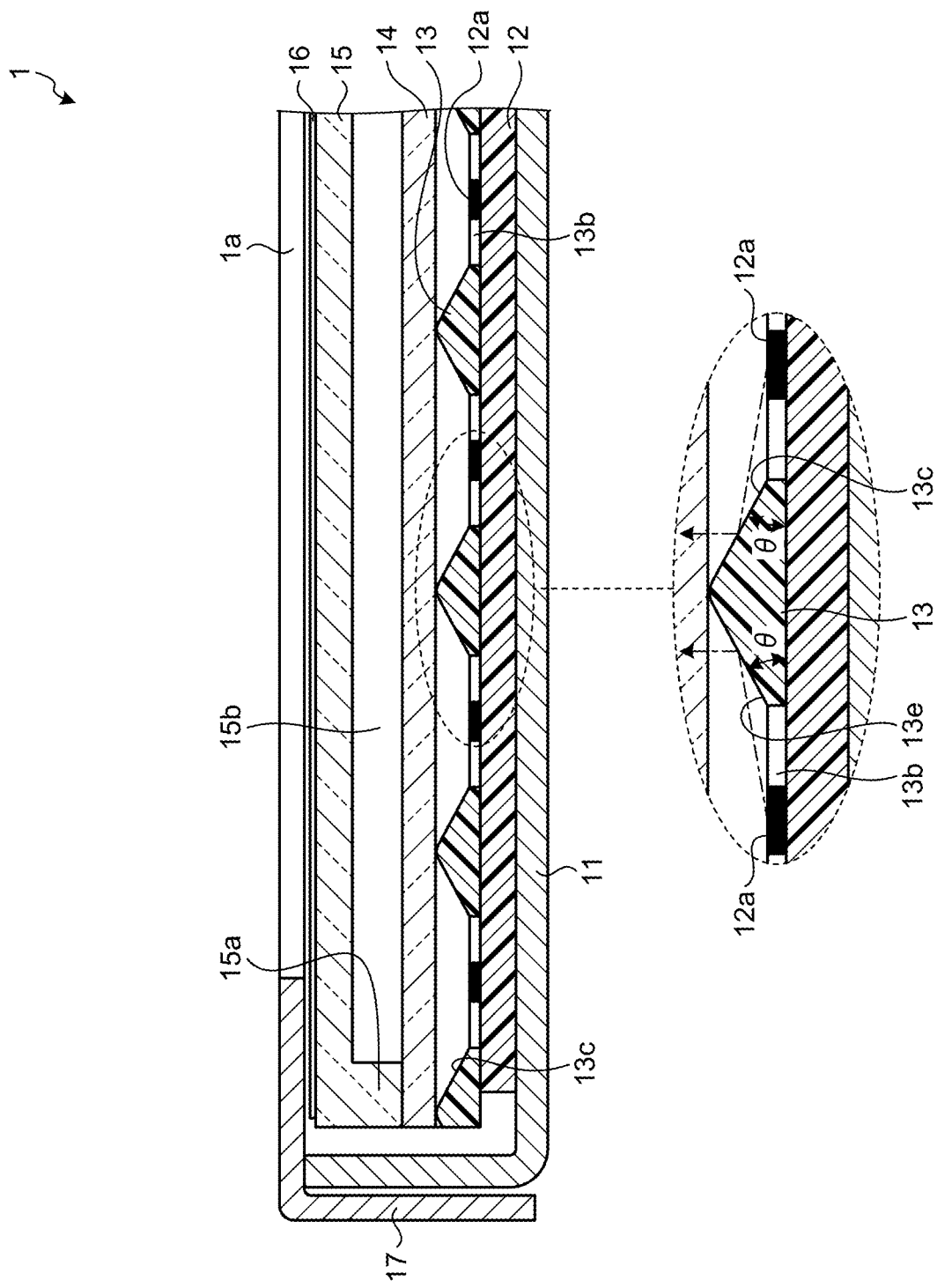

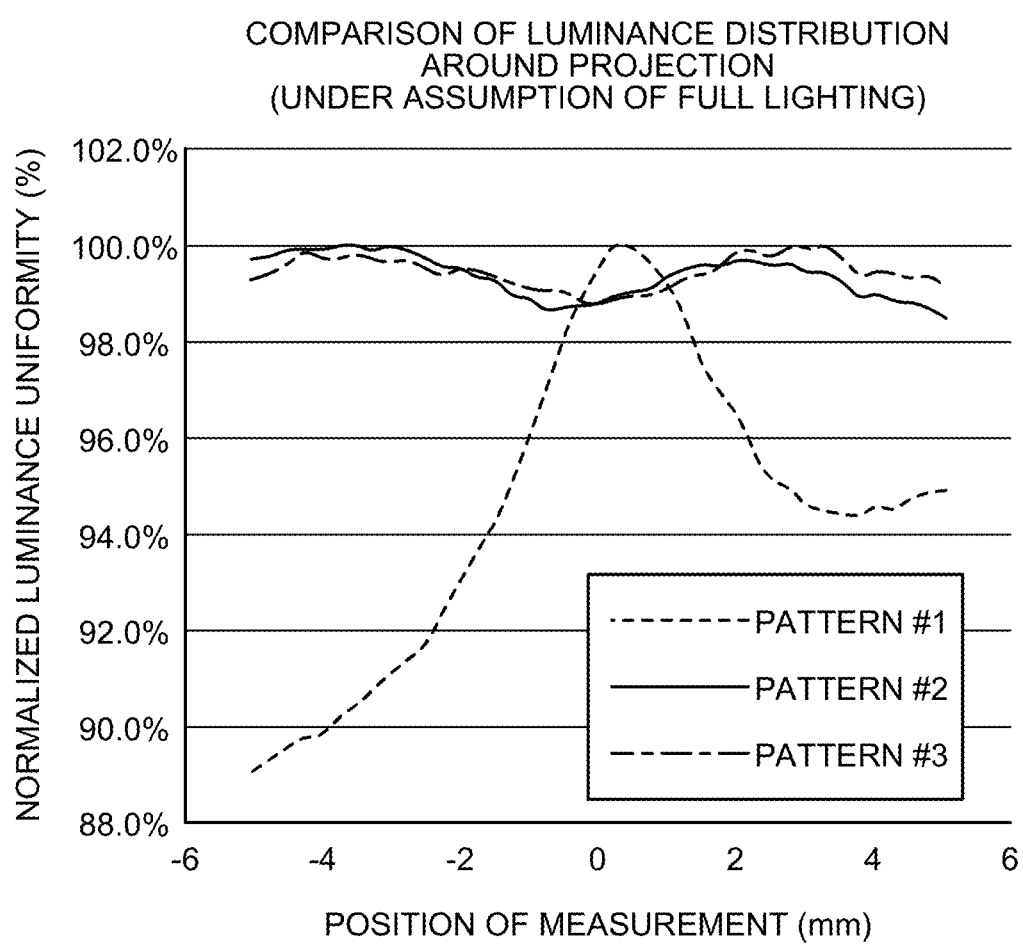

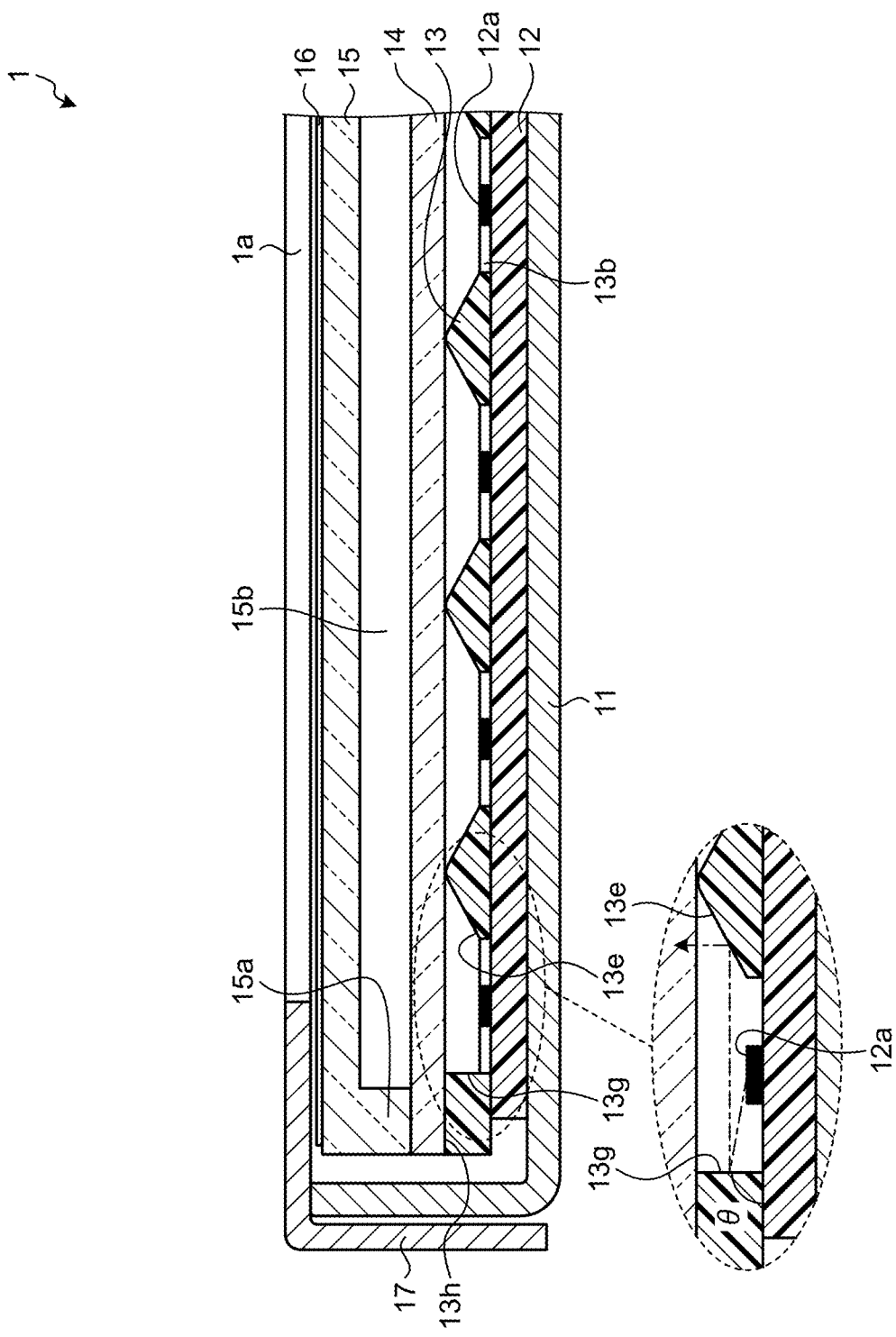

PLANAR ILLUMINATION DEVICE WITH SPACER BETWEEN LENS AND DIFFUSER

FIELD

The present invention relates to a planar illumination device.

BACKGROUND

Conventional so-called direct under type planar illumination devices have a light source substrate having a plurality of light-emitting devices, such as light emitting diodes (LEDs), two-dimensionally arrayed thereon, and a lens (prism array) and a diffuser disposed in front of a light-emitting surface of the light source substrate. Such a direct under type planar illumination device is suitable for local dimming that increases the contrast by separately controlling the luminance of the light-emitting devices depending on the bright and dark areas of a video scene. Most of this type of planar illumination device has an independent spacer that is provided to an end of a housing and that supports an end of the diffuser, with the intention to separate the diffuser from the light sources and the lens by a certain distance to obtain desired optical characteristics (for example, see Patent Literatures 1 and 2).

CITATION LIST

Patent Literature

Patent Literature 1: Japanese Patent Application Laid-open No. 2018-106971
Patent Literature 2: Japanese Patent Application Laid-open No. 2018-106973

SUMMARY

Technical Problem

Unfortunately, the independent spacer provided at the end of the housing increases areas from which no light is emitted, in the periphery of the light-emitting surface and thus increases a frame part covering the periphery of the light-emitting surface of the housing. This structure is therefore difficult to satisfy the increasing demand for narrower frames. Moreover, there is room for improvement in design and production in other components.

From the above viewpoint, the present invention aims to provide a planar illumination device that allows for easier design and production of the device.

To solve the above-mentioned problem and to achieve the object, a planar illumination device according to one aspect of the present invention includes a light source substrate, a lens, a diffuser, and a spacer. The light source substrate includes a plurality of light-emitting devices two-dimensionally arrayed thereon. The lens is configured to receive light emitted from the light source substrate, has small prisms arrayed on the surface thereof, and controls distribution of light. The diffuser is configured to receive light emitted from the lens. The spacer is integrated with the diffuser and arranged between the lens and the diffuser and has its front end contacting the lens to form a certain amount of gap between the lens and the diffuser.

Solution to Problem

A planar illumination device according to an embodiment of the present invention exerts advantageous effects of making design and production of the device easier.

BRIEF DESCRIPTION OF DRAWINGS

FIG. 3 is a sectional view of the backlight.
FIG. 12 is a graph that compares examples of luminance distribution in areas around the projection.
FIG. 13 is a sectional view of a backlight according to a fourth embodiment.

DESCRIPTION OF EMBODIMENTS

Figure 1:
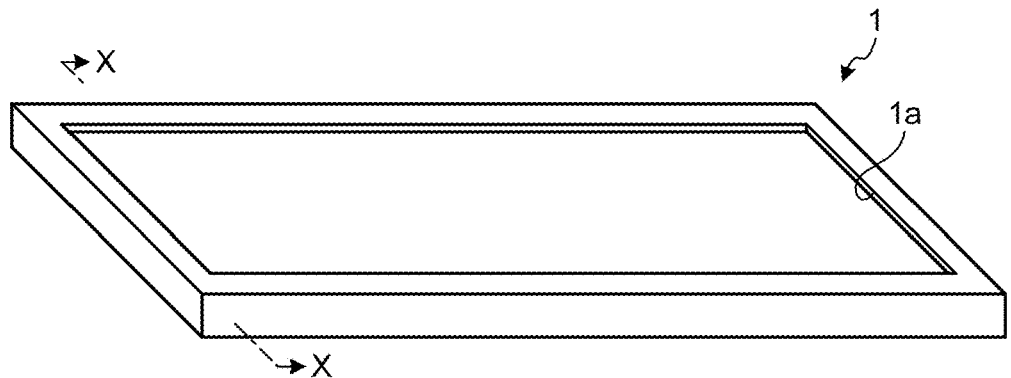
FIG. 1 is an outside perspective view of a backlight according to a first embodiment.

A flat illumination device according to an embodiment will now be described with reference to the drawings. It should be noted that the embodiment is not intended to limit the present invention. The scale of a component to another and the proportion of a component illustrated in the drawings may be different from the actual scale and proportion. The scale and proportion of a component may be different across the drawings. What are described in an embodiment or in a modification are basically similarly applied to other embodiments and modifications.

First Embodiment

FIG. 1 is an outside perspective view of a backlight 1 according to a first embodiment. The backlight 1 is an example of a planar illumination device. The backlight 1 is disposed in the back of a liquid crystal display included in a navigation system, an indicator, or a similar apparatus.

In FIG. 1, the backlight 1 has a rectangular plate-like outer shape. A surface (the top surface in the drawing) thereof includes an aperture 1a through which light is emitted outward from the inside. When used for a navigation system, an indicator, or a similar apparatus, the liquid crystal display is mounted on the surface of the backlight 1 including the aperture 1a.

Figure 2:
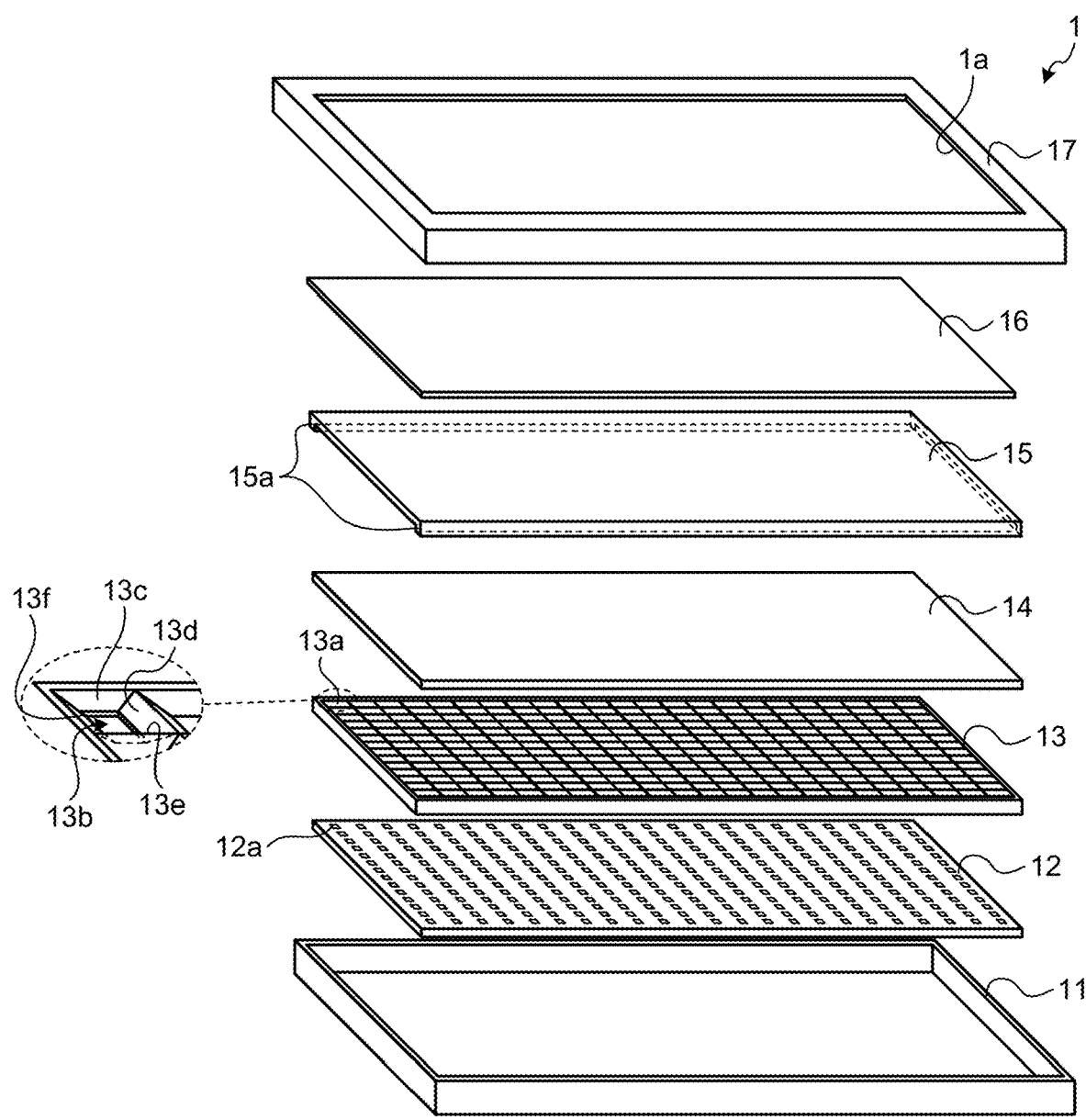
FIG. 2 is an exploded perspective view of the backlight.

FIG. 2 is an exploded perspective view of the backlight 1 illustrated in FIG. 1. In FIG. 2, the backlight 1 includes a first frame 11, an LED substrate 12, a grating reflector 13, a lens 14, a diffuser 15, a sheet 16, and a second frame 17.

The first frame 11 has a box-like shape including a bottom with no lids. The first frame 11 is made by, for example, sheet-metal processing or die-casting. The backlight 1 is configured with the first frame 11 accommodating therein the LED substrate 12, the grating reflector 13, the lens 14, the diffuser 15, and the sheet 16 in this order and with the second frame 17 covering the first frame 11 from the top.

The LED substrate 12 is a rectangular thin substrate on which a plurality of LEDs 12a are two-dimensionally arrayed. The LED substrate 12 is an example of a light source substrate. The LED 12a is an example of a light-emitting device.

The grating reflector 13 reflects light proceeding toward the side of the LED 12a on the LED substrate 12 and aligns the light in a direction (direction perpendicular to the opening surface of the aperture 1a) toward an object to be illuminated. The grating reflector 13 is used to improve the optical characteristics as the illumination device. The grating reflector 13 is divided into a plurality of rectangular or square cells 13a. Each cell 13a includes four reflection surfaces 13c, 13d, 13e, and 13f. The four reflection surfaces 13c, 13d, 13e, and 13f surround an aperture 13b in which the LED 12a is accommodated. The reflection surfaces 13c, 13d, 13e, and 13f are slanted from the edge of the aperture 13b toward the edge of the cell 13a and reflects light emitted toward the side of the LED 12a, toward the lens 14. The grating reflector 13 is formed of, for example, white resin, so as to increase the effect of reflection.

The lens 14 is a sheet including small prisms arrayed thereon. The lens 14 controls distribution of light incident from the grating reflector 13 and emits the light toward the diffuser 15. The lens 14 is formed of, for example, transparent resin.

The diffuser 15 diffuses light incident from the lens 14 and equalizes distribution of light. The diffuser 15 is formed of, for example, resin. The diffuser 15 includes plate-like projections 15a extending in a direction toward the light source, at respective long sides thereof. The projection 15a allows the diffuser 15 to keep a certain amount of gap with the light source side (directly, the lens 14 side adjacent to the diffuser 15). The projection 15a is integrally formed (integrated) with the diffuser 15 by injection molding or a similar method. The projection 15a is an example of a spacer.

The sheet 16 is an optical sheet for controlling the optical characteristics, and may include a single sheet or a plurality of sheets. The sheet 16 includes a prism sheet (for example, the brightness enhancement film made by the 3M company), a reflective polarizing sheet (for example, the dual brightness enhancement film by the 3M company), and other types of sheet.

The second frame 17 has a box-like outer shape including a bottom with the aperture 1a and including no lids. The second frame 17 is engaged with the first frame 11 to construct the backlight 1. The outer periphery of the aperture 1a of the second frame 17 serves as, what is called, a frame.

FIG. 3 is a sectional view of the backlight 1, and illustrates a part of the sectional view of FIG. 1 along X-X line. In FIG. 3, the LED substrate 12 is attached to the inner surface of the bottom of the first frame 11 with, for example, a double-sided tape. The grating reflector 13 is laminated on a surface of the LED substrate 12, the surface opposite to the surface facing the bottom surface of the first frame 11. The LED 12a of the LED substrate 12 is accommodated in the aperture 13b of the grating reflector 13. As illustrated in the partial enlarged view in the bottom of FIG. 3, the tests demonstrate that good optical characteristics are obtained by setting the angles of slant θ of the reflection surfaces 13c and 13e (as with the reflection surfaces 13d and 13f) of the grating reflector 13 at, preferably, from 20° to 70°, more preferably, from 30° to 60°.

The lens 14 is laminated on a surface of the grating reflector 13, the surface opposite to the surface facing the LED substrate 12. The diffuser 15 is laminated on a surface of the lens 14, the surface opposite to the surface facing the grating reflector 13. The projections 15a formed at ends of the diffuser 15 contact with the lens 14 and serve as spacers, thereby forming a certain amount of gap 15b between the lens 14 and a flat portion of the diffuser 15. This structure allows light incident from the lens 14 to be sufficiently diffused by the diffuser 15 and allows the light to be evenly emitted in a direction toward the aperture 1a. Furthermore, light emitted from the lens 14 toward the ends of the diffuser 15 is reflected by the projections 15a, so as to reduce leakage of light.

The sheet 16 is further laminated on a surface of the diffuser 15, the surface opposite to the surface facing the lens 14. The second frame 17 mounted on the sheet 16 on a surface opposite to the surface facing the diffuser 15 is engaged with the first frame 11 so as to surround the periphery of the first frame 11. The first frame 11 and the second frame 17 are fastened to each other, for example, with a claw fastener (not illustrated) provided to the first frame 11 or the second frame 17.

Figure 4A:
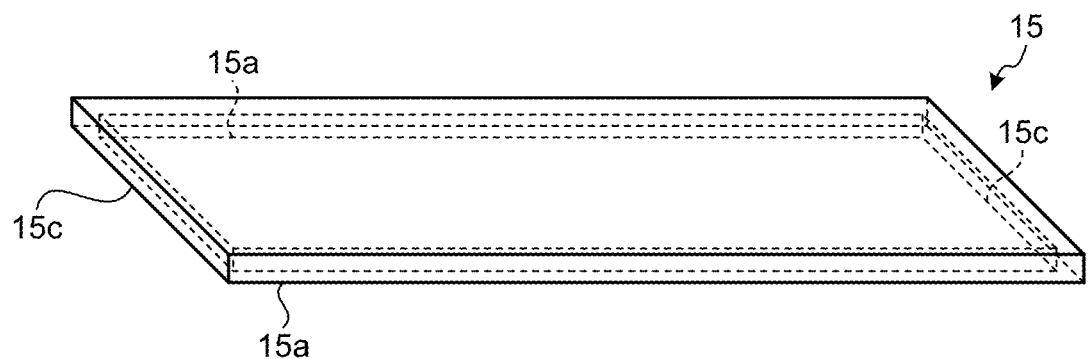
FIG. 4A is an outside perspective view (1) that illustrates another example structure of a diffuser.

FIG. 4A is an outside perspective view illustrating another example structure of the diffuser 15. The diffuser 15 in FIG. 4A includes plate-like projections 15c extending in a direction toward the light source (downward, in the drawing), at the respective short sides in addition to the projections 15a formed at the respective long sides of the diffuser 15, as illustrated in FIG. 2. In other words, each of the four sides (both of the long sides and both of the short sides) of the diffuser 15 includes the plate-like projection 15a or 15c extending in the direction toward the light source. In case that either of the long sides or the short sides includes the plate-like projection 15a or 15c, stiffness of the diffuser 15 with formation of the projections thereof at the two long sides is higher than that at the two short sides.

The projections 15a and 15c formed at the four sides (the long sides and the short sides) of the diffuser 15 can increase the stiffness of the diffuser 15. For example, if the liquid crystal display assembled with the backlight 1 uses a touchscreen, the flat portion of the diffuser 15 may be subjected to load when the touchscreen is pressed, and the load may warp the diffuser 15. Increasing stiffness can reduce such warpage of the diffuser 15. Without being limited to the structure in which the projections 15a and 15c are formed at the four sides of the diffuser 15, the projections may be formed at three sides (one of the long sides or the short sides has no projections) of the diffuser 15.

Figure 4B:
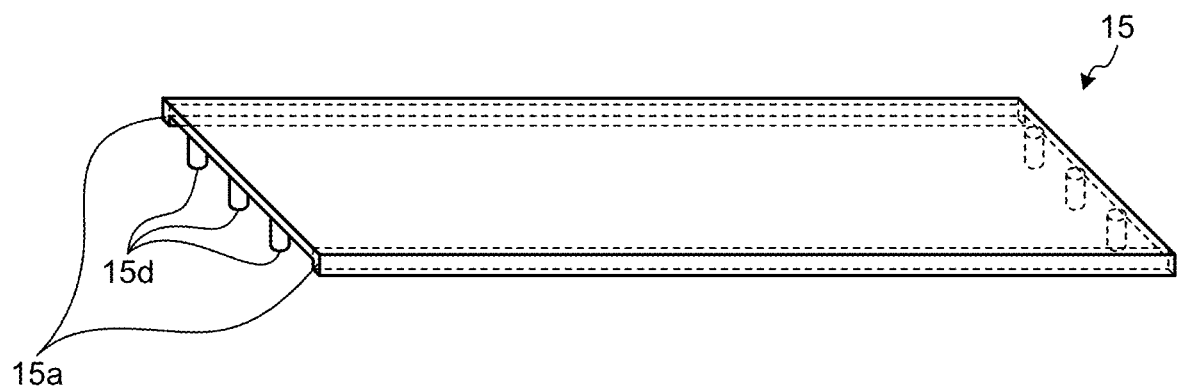
FIG. 4B is an outside perspective view (2) that illustrates another example structure of the diffuser.

FIG. 4B is an outside perspective view illustrating another example structure of the diffuser 15. The diffuser 15 in FIG. 4B includes a plurality of rod-shaped projections 15d extending in a direction toward the light source (downward, in the drawing), at each of the short sides in addition to the projections 15a formed at the respective long sides of the diffuser 15, as illustrated in FIG. 2. In the example drawing, although three projections 15d are formed at each short side, the number of the projections 15d may be increased or decreased depending on the required strength. The projections 15d may be arranged on the short side at regular intervals or may be arranged at irregular intervals. The long side and the short side may be switched, that is, the short side may include a plate-like projection, whereas the long side may include rod-shaped projections.

The plate-like projections 15a and the rod-shaped projections 15d can increase the stiffness of the diffuser 15. Instead of including the projections 15a and 15d at the four sides, the diffuser 15 may include plate-like or rod-shaped projections at three of the sides.

Figure 4C:
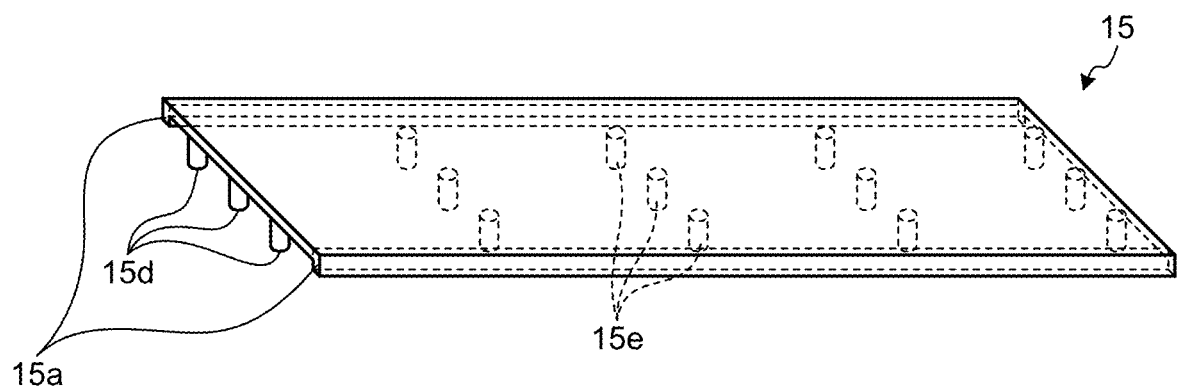
FIG. 4C is an outside perspective view (3) that illustrates another example structure of the diffuser.

FIG. 4C is an outside perspective view illustrating another example structure of the diffuser 15. The diffuser 15 illustrated in FIG. 4C includes plate-like projections 15a at the respective long sides and a plurality of rod-shaped projections 15d at each short side thereof, as same as that illustrated in FIG. 4B. In addition to these projections, the diffuser 15 in FIG. 4C includes a plurality of rod-shaped projections 15e extending in a direction toward the light source (downward, in the drawing), in the flat portion. In the example drawing, although a total of nine projections 15e are formed in the flat portion, the number of the projections 15e may be increased or decreased depending on the required strength. The projections 15e may be arranged in the flat portion at regular intervals or may be arranged at irregular intervals.

The plate-like projections 15a and the rod-shaped projections 15d and 15e can increase the stiffness of the diffuser 15. Without being limited to the structure in which the projections 15a, 15d, and 15e are formed on the four sides and the flat portion of the diffuser 15, the projections may be formed on three of the sides and the flat portion, on two of the sides and the flat portion, on one of the sides and the flat portion, or only in the flat portion of the diffuser 15.

FIG. 4A illustrates the diffuser 15 including only plate-like projections. FIG. 4B and FIG. 4C illustrate the diffuser 15 including both plate-like projections and rod-shaped projections. The diffuser 15 including only the rod-shaped projections may be formed.

Second Embodiment

In the first embodiment, the diffuser 15 includes projections serving as spacers. In the second embodiment, the lens 14 includes projections serving as spacers.

The outer appearance of the backlight 1 according to the second embodiment is the same as that illustrated in FIG. 1. The backlight 1 has a rectangular plate-like outer shape. One of the surfaces (the top surface in the drawing) of the backlight 1 includes the aperture 1a through which light is emitted outward from the inside thereof. A liquid crystal display of a navigation system, an indicator, or a similar apparatus is mounted on the surface of the backlight 1 including the aperture 1a.

Figure 5:
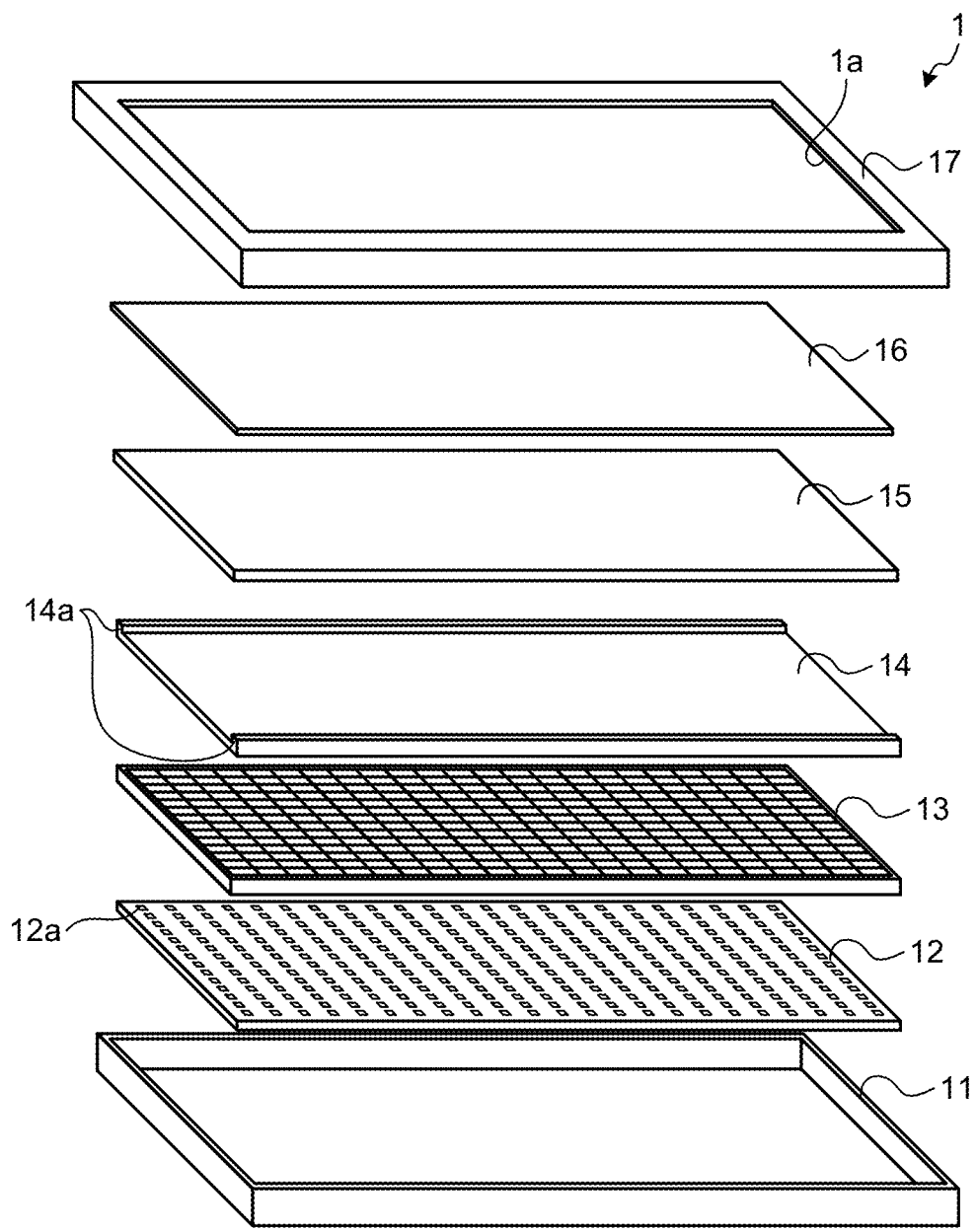
FIG. 5 is an exploded perspective view of a backlight according to a second embodiment.

FIG. 5 is an exploded perspective view of the backlight 1 according to the second embodiment. In FIG. 5, the backlight 1 includes the first frame 11, the LED substrate 12, the grating reflector 13, the lens 14, the diffuser 15, the sheet 16, and the second frame 17.

The first frame 11 has a box-like shape including a bottom with no lids. The first frame 11 is made by, for example, sheet-metal processing or die-casting. The backlight 1 is configured with the first frame 11 accommodating therein the LED substrate 12, the grating reflector 13, the lens 14, the diffuser 15, and the sheet 16 in this order and with the second frame 17 covering the first frame 11 from the top.

The LED substrate 12 is a rectangular thin substrate on which a plurality of LEDs 12a are two-dimensionally arrayed.

The grating reflector 13 reflects light proceeding toward the side of the LED 12a on the LED substrate 12 and aligns the light in a direction (direction perpendicular to the opening surface of the aperture 1a) toward an object to be illuminated. The grating reflector 13 is used to improve the optical characteristics as the illumination device.

The lens 14 is a sheet including small prisms arrayed thereon. The lens 14 controls distribution of light incident from the grating reflector 13 and emits the light toward the diffuser 15. The lens 14 is formed of, for example, transparent resin. The lens 14 includes plate-like projections 14a extending in a direction remote from the light source, at respective long sides thereof. The projection 14a maintains a amount of gap between the diffuser 15 and the lens 14. The projection 14a is an example of spacer. The projection 14a is integrally formed (integrated) with the lens 14 by injection molding or a similar method.

The lens 14 is usually made of a transparent material such as resin. The projection 14a is therefore transparently formed by injection molding in use of a single type of resin or a similar material. The projections 14a formed at ends on the long sides of the lens 14 may sometimes be required to stop leakage of light from the ends of the lens 14. As one of measures, a reflector may be attached to the inner wall surface of the plate-like projection 14a.

Two-color molding may be used as another measure. Two-color molding can produce the body portion and the projection 14a of the lens 14 in a single operation using respective different materials. For example, the body portion may be formed of transparent resin or the like, and the projection 14a may be formed of white resin or the like.

The diffuser 15 diffuses light emitted from the lens 14 to make the light evenly distributed. The diffuser 15 is made of, for example, resin. The sheet 16 is an optical sheet for controlling the optical characteristics. A sheet or a plurality of sheets may be used.

The second frame 17 has a box-like outer shape including a bottom with the aperture 1a and including no lids. The second frame 17 is engaged with the first frame 11 to construct the backlight 1. The outer periphery of the aperture 1a of the second frame 17 serves as, what is called, a frame.

Figure 6:
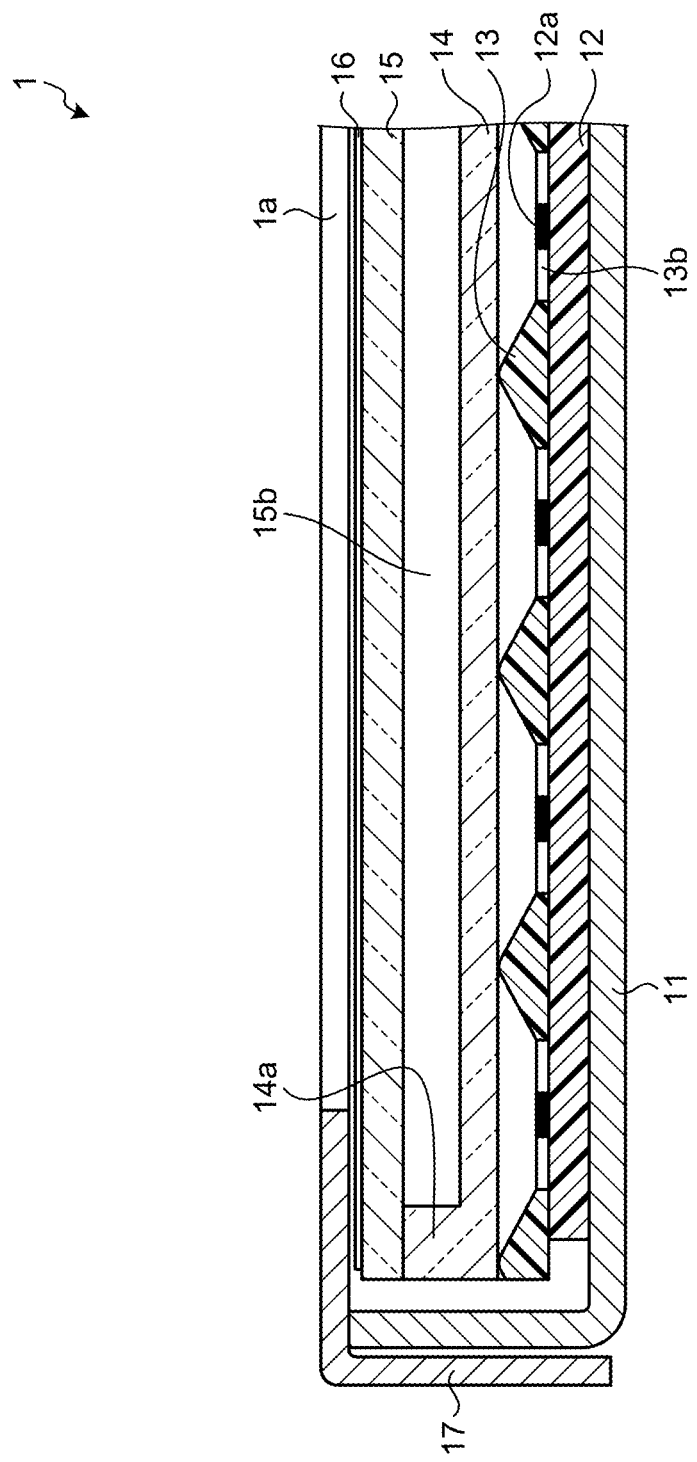
FIG. 6 is a sectional view of the backlight.

FIG. 6 is a sectional view of the backlight 1, and illustrates a part of the sectional view of FIG. 1 along X-X line. In FIG. 6, the LED substrate 12 is attached to the inner surface of the bottom of the first frame 11 with, for example, a double-sided tape. The grating reflector 13 is laminated on a surface of the LED substrate 12, the surface opposite to the surface facing the bottom surface of the first frame 11. The LED 12a on the LED substrate 12 is accommodated in the aperture 13b of the grating reflector 13.

The lens 14 is laminated on a surface of the grating reflector 13, the surface opposite to the surface facing the LED substrate 12. The diffuser 15 is laminated on a surface of the lens 14, the surface opposite to the surface facing the grating reflector 13. The projections 14a formed at ends of the lens 14 contact with the diffuser 15 and serve as spacers, which forms a certain amount of gap 15b between a flat portion of the lens 14 and the diffuser 15. This structure allows light incident from the lens 14 to be sufficiently diffused by the diffuser 15 and allows the light to be evenly emitted in a direction toward the aperture 1a. The projections 14a reflect light emitted outward from the ends of the lens 14 and thus can reduce leakage of light. The projection 14a reflects light further effectively when a reflector is attached to the projection 14a or when the projection 14a is formed of white resin or a similar material.

The sheet 16 is further laminated on a surface of the diffuser 15, the surface opposite to the surface facing the lens 14. The second frame 17 mounted on the sheet 16 on a surface opposite to the surface facing the diffuser 15 is engaged with the first frame 11 so as to surround the periphery of the first frame 11.

The projection of the lens 14 can be modified as with the projection of the diffuser 15 in the modifications illustrated in FIG. 4A to FIG. 4C and related modifications described with reference to FIG. 4A to FIG. 4C. Unlike the projection of the diffuser 15, the projection is formed on the lens 14, and extending upwardly, not downwardly, in the drawing, from the lens 14 toward the diffuser 15. The projection formed in the flat portion of the lens 14 is made of the same material, transparent resin or the like, as that of the lens 14. The projection is thus light transmissive and reflects less light, which is less likely to impair the optical characteristics.

Third Embodiment

Figure 7:
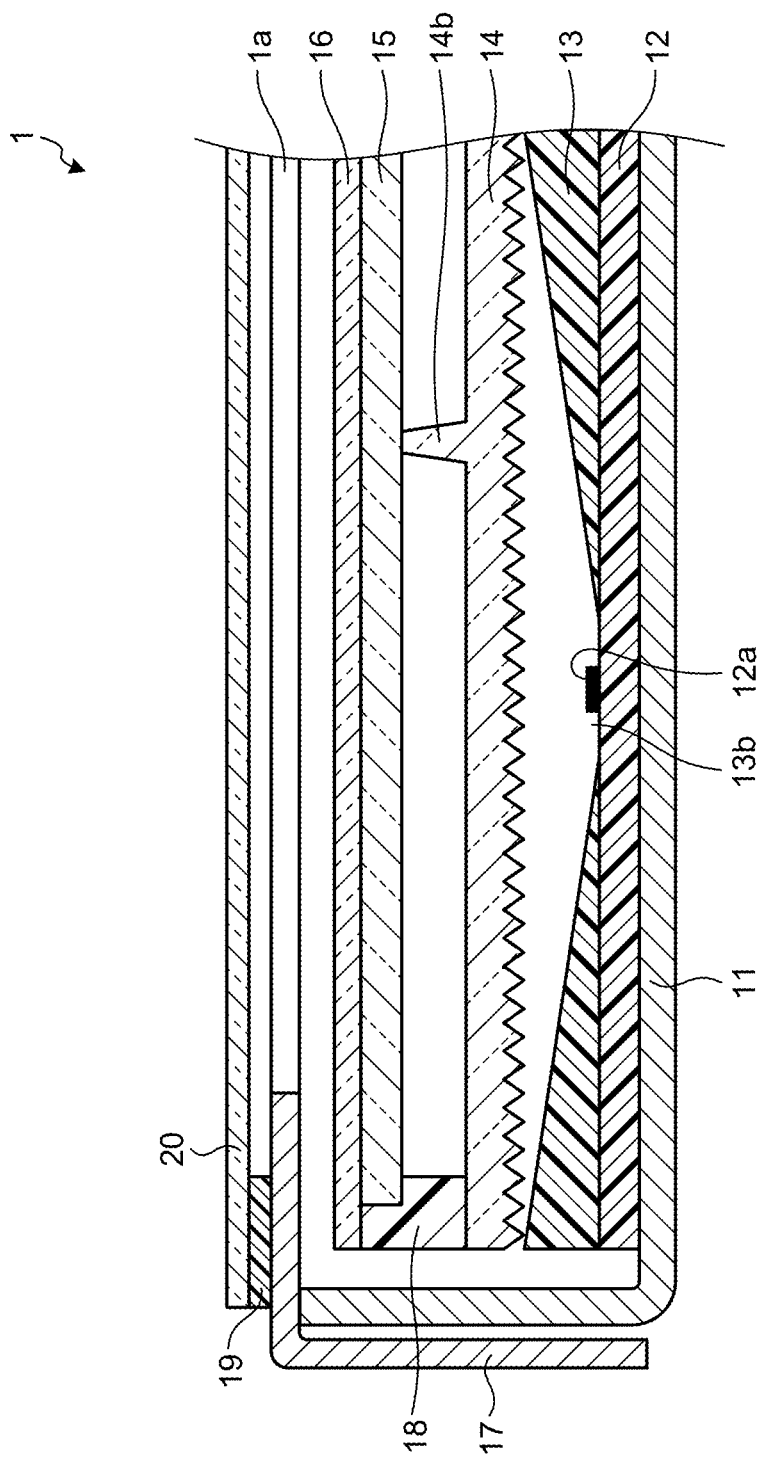
FIG. 7 is a sectional view of a backlight according to a third embodiment.

The case in which the projections are formed on the lens 14 will now be described in detail. FIG. 7 is a sectional view of the backlight 1 according to the third embodiment. As with FIG. 6, FIG. 7 illustrates a part of the sectional view of FIG. 1 along X-X line. Unlike the structure of FIG. 6, in FIG. 7, one or a plurality of rod-shaped projections 14b are formed on a surface of the lens 14 facing the diffuser 15. A surface of the lens 14 opposite to the surface facing the diffuser 15 includes a prismatic pattern. The surface of the lens 14, facing the diffuser 15, is processed into a form to diffuse light, using, for example, a laser dot.

In FIG. 7, although a spacer 18 supporting an end of the diffuser 15 is formed separately from the lens 14 and the diffuser 15, the spacer 18 may be integrally formed with the lens 14 or the diffuser 15. Although it is not an essential difference, the outer surface of the second frame 17 including the aperture 1a is connected with an end of a cover plate 20 through a cushion tape 19. Other structural components are the same as those of FIG. 6.

Figure 8:
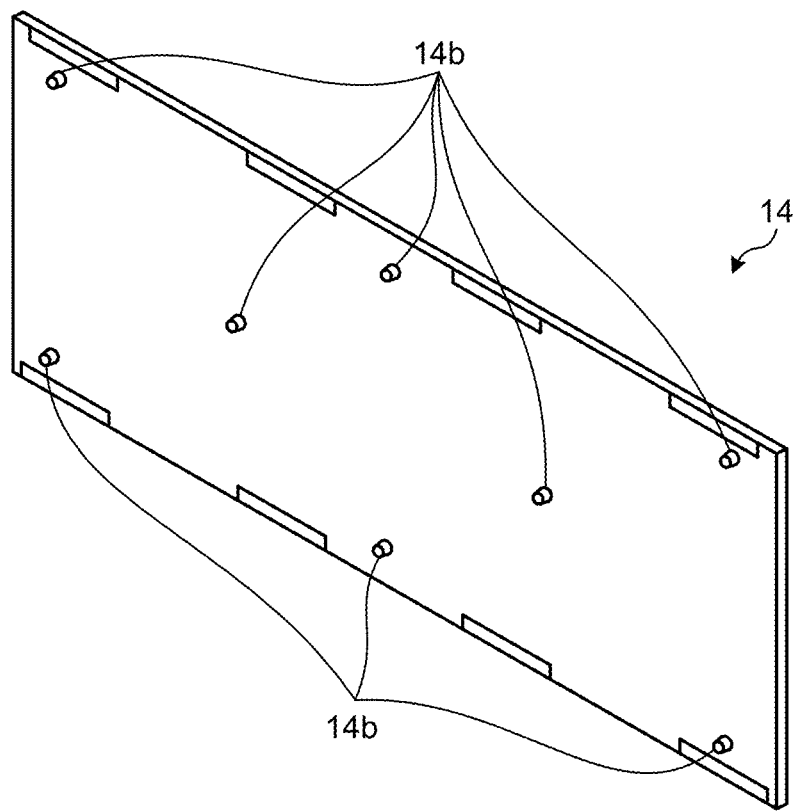
FIG. 8 is an outside perspective view of a lens.

FIG. 8 is an outside perspective view of the lens 14 viewed from a side of the diffuser 15. In FIG. 8, one or a plurality of rod-shaped projections 14b are integrally formed with the lens 14, in the front of the lens 14 (facing the diffuser 15) in the drawing. The example drawing illustrates a total of eight projections 14b, including three projections 14b along each of the two long sides and two projections 14b around the center. The number of the projections 14b and the locations thereof can be changed as appropriate.

Figure 9:
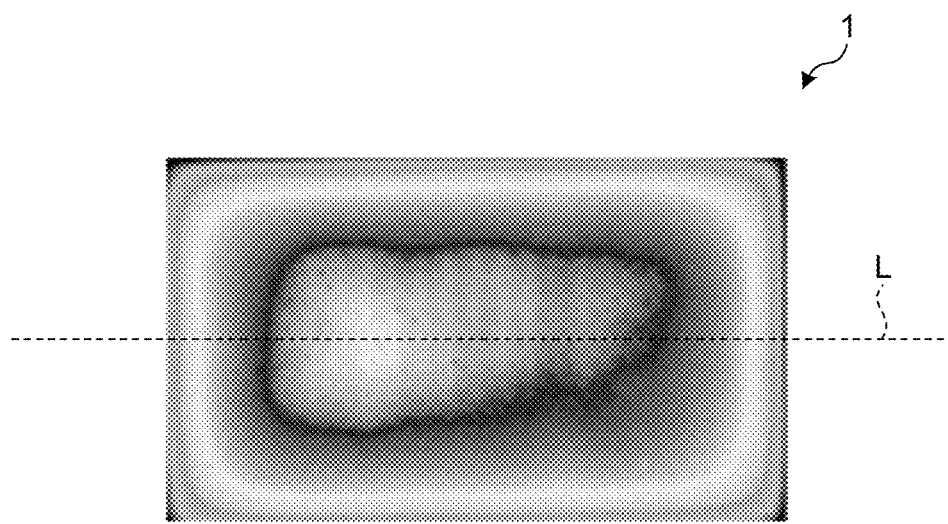
FIG. 9 is a drawing that illustrates a line L along which the luminance of the backlight is observed.
Figure 10:
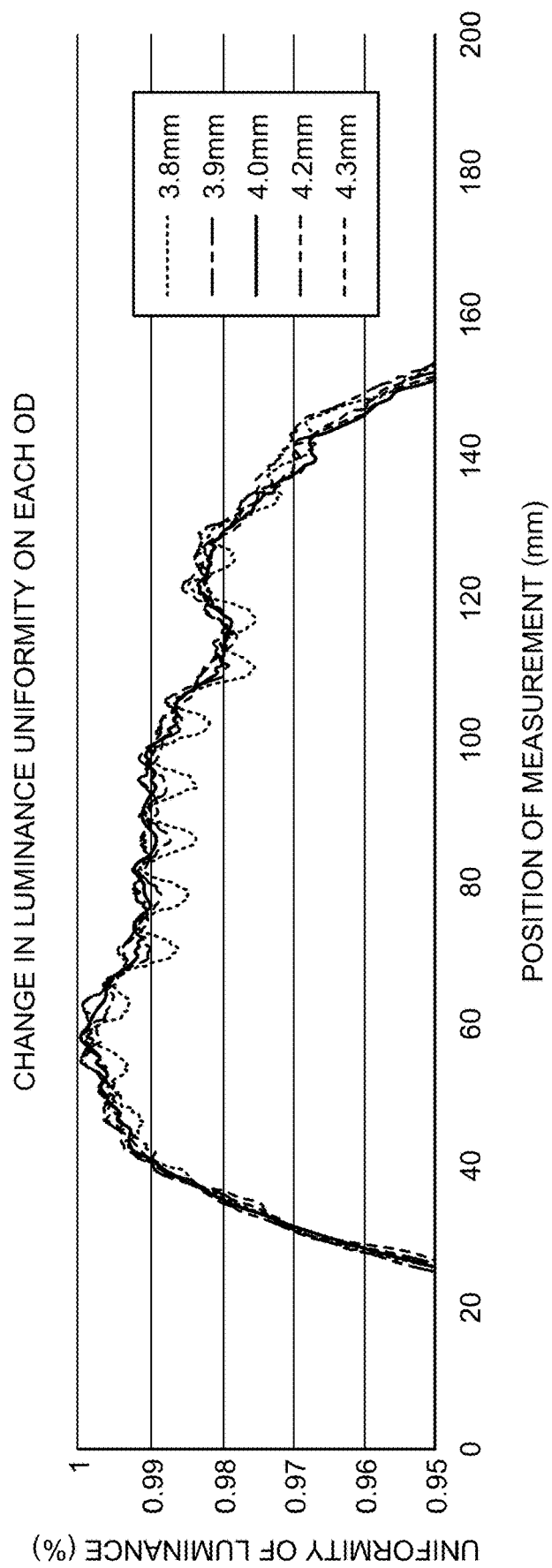
FIG. 10 is a graph that indicates an example change in the uniformity of luminance on each optical distance (OD).

One or a plurality of projections 14b extending from the lens 14 and contacting the diffuser 15 can reduce warpage and deformation of the diffuser 15 and keep a certain distance (optical distance (OD)) between the diffuser 15 and the LED 12a. This structure is effective in keeping the luminance uniform. FIG. 9 is a drawing that illustrates a line L along which the luminance of the backlight 1 is observed. FIG. 10 is a graph of an example change in the uniformity of luminance on each optical distance. In FIG. 10, the x-axis represents the position of measurement along the line L of FIG. 9, and the y-axis represents the uniformity of luminance.

In this example, the optimal OD is 4.0 mm, at which OD (4.0 mm) a change in the luminance affected by the pitch between the LEDs 12a is small. When the OD is changed to, for example, 3.8 mm and 4.3 mm, due to warpage or deformation of the diffuser 15, a change in the luminance occurring with a change in the pitch between the LEDs 12a is increased. In this embodiment, the projection 14b keeps the OD at an optimal value (4.0 mm) and thus can keep the luminance uniform.

Figure 11A:
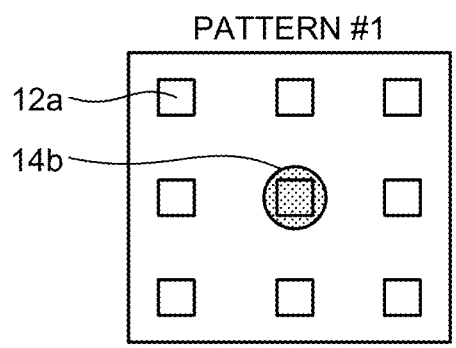
FIG. 11A is a drawing (1) that illustrates example arrangement of a projection.
Figure 11B:
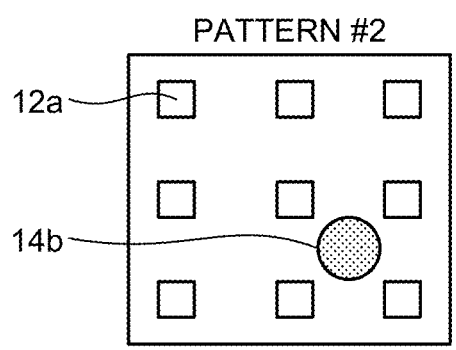
FIG. 11B is a drawing (2) that illustrates example arrangement of the projection.
Figure 11C:
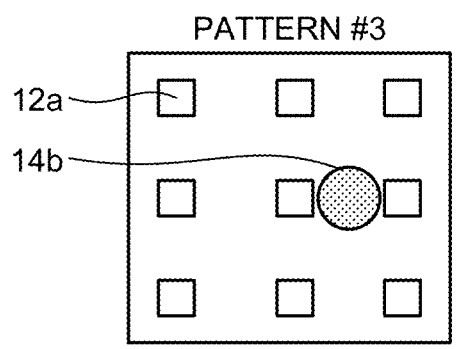
FIG. 11C is a drawing (3) that illustrates example arrangement of the projection.

The relative position of the projection 14b to the LED 12a will now be examined. FIG. 11A to FIG. 11C are drawings that illustrate example arrangement of the projection 14b. FIG. 11A illustrates Pattern no. 1 in which the projection 14b is arranged directly above any of the LEDs 12a. FIG. 11B illustrates Pattern no. 2 in which the projection 14b is arranged in the middle of four LEDs 12a vertically and horizontally adjacent to one another. FIG. 11C illustrates Pattern no. 3 in which the projection 14b is arranged in the middle of two LEDs 12a vertically or horizontally adjacent to each other.

FIG. 12 is a drawing that compares examples of distribution of luminance in areas around the projection. The x-axis represents the position of measurement and the y-axis represents the uniformity of luminance, with all the light sources on (at the time of full lighting). In Pattern no. 1 of FIG. 12, the luminance is increased in the area close to the projection (position of measurement is substantially 0 mm), and the uniformity of luminance is low. Patterns no. 2 and no. 3 have good and alike results in the uniformity of luminance. With regards to the incidence of non-uniform luminance, unacceptable level of non-uniformity is observed with Pattern no. 1, whereas Patterns no. 2 and no. 3 keep the non-uniformity within the acceptable range. With one of the light sources on (at the time of one-source lighting) to perform local dimming, an intolerable bright spot is observed directly above the light source in Pattern no. 1. In Pattern no. 3, irregular dots are conspicuously observed. In Pattern no. 2, although irregular dots are observed, they are less noticeable. Considering all the factors, Pattern no. 2 is more preferable than Pattern no. 3.

Fourth Embodiment

A structure of a fourth embodiment facilitates connection between the grating reflector 13 and the lens 14, which achieves easier design and production processes of the product. For example, as illustrated in FIG. 3, the grating reflector 13 contacts the lens 14 at an end surface formed at the outer edge of the reflection surface 13c or a similar portion, as mentioned above. Since the reflection surface 13c or the similar portion is slanted, the contact surface between the end of the grating reflector 13 and the lens 14 is small. This structure is inconvenient in attaching the end of the grating reflector 13 to the lens 14 with a double-sided tape or a similar method, because a sufficiently large adhesion area is not available. The grating reflector 13 is connected with the lens 14 only at an end thereof using a double-sided tape or the like, so as not to interfere with thermal expansion and to reduce warpage of the lens 14 and other parts. It is therefore important to secure the adhesion area in the end of the grating reflector 13. Such a measure may be taken that forms a flat margin at the outer edge of the reflection surface 13c or a similar portion to secure a sufficiently large adhesion area. Formation of a margin on the grating reflector 13 is, however, counterproductive considering increasing demand for narrower frames.

The outer appearance of the backlight 1 according to the fourth embodiment is the same as that illustrated in FIG. 1. The backlight 1 has a rectangular plate-like outer shape. One of the surfaces (the top surface in the drawing) of the backlight 1 includes the aperture 1a through which light is emitted outward from the inside thereof. A liquid crystal display of a navigation system, an indicator, or a similar apparatus is mounted on the surface of the backlight 1 including the aperture 1a.

FIG. 13 is a sectional view of the backlight 1 according to the fourth embodiment and illustrates a part of the sectional view of FIG. 1 along X-X line. In FIG. 13, the LED substrate 12 is attached to the inner surface of the bottom of the first frame 11 with, for example, a double-sided tape. The grating reflector 13 is laminated on a surface of the LED substrate 12, the surface opposite to the surface facing the bottom surface of the first frame 11. The LED 12a on the LED substrate 12 is accommodated in the aperture 13b of the grating reflector 13.

A reflection surface 13g formed at the end of the grating reflector 13 is slanted at a larger angle, substantially 90° in the example drawing, than the angles of other surfaces, such as the reflection surface 13e. As mentioned above, the reflection surfaces 13c to 13f of the grating reflector 13 are preferably slanted at an angle θ from 20° to 70°, more preferably, from 30° to 60°, whereas the reflection surface 13g formed at the end of the grating reflector 13 is slanted preferably at an angle θ of 80° or larger. An increase in the slant angle of the reflection surface 13g, located at the end of the grating reflector 13, increases a contact surface 13h contacting the lens 14. This structure can increase the strength of connection in use of a double-sided tape or a similar method.

As illustrated in the partial enlarged view in the bottom of FIG. 13, a part of light emitted from the LED 12a toward the reflection surface 13g of the grating reflector 13 is reflected through the reflection surface 13g, reaches a facing reflection surface 13e, and then proceeds toward the lens 14. An increase in the slant angle of the reflection surface 13g, located at the end of the grating reflector 13, therefore does not significantly affect the optical characteristics.

The lens 14 is laminated on a surface of the grating reflector 13, the surface opposite to the surface facing the LED substrate 12. The diffuser 15 is laminated on a surface of the lens 14, the surface opposite to the surface facing the grating reflector 13. The projections 15a formed at ends of the diffuser 15 contact the lens 14, which forms a certain amount of gap 15b between the lens 14 and a flat portion of the diffuser 15.

The sheet 16 is further laminated on a surface of the diffuser 15, the surface opposite to the surface facing the lens 14. The second frame 17 mounted on the sheet 16 on a surface opposite to the surface facing the diffuser 15 is engaged with the first frame 11 so as to surround the periphery of the first frame 11.

Although the structure of FIG. 13 is based on the structure of FIG. 3, the structure may be based on the structure of FIG. 6. Projections of the diffuser 15 and the lens 14 may be modified as with those illustrated in the modifications of FIG. 4A to FIG. 4C and related modifications described with reference to FIG. 4A to FIG. 4C.

The contact surface between the end of the grating reflector 13 and the lens 14 of FIG. 6 includes a small flat portion on the top of the slanted reflection surface. The grating reflector 13 may be connected with the lens 14 by attaching this flat portion to a contact surface of the lens 14 using a double-sided tape or a similar method. The grating reflector 13 and the lens 14 may be simply laminated one over the other, instead of being fixed to each other using a double-sided tape or a similar method. In those cases, the slant angle of the reflection surface formed at the end of the grating reflector 13 is preferably from 20° to 70°, or from 30° to 60°, as earlier described, or may be equal to or larger than 45°.

The embodiments of the present invention have been described above. The present invention is, however, not limited thereto, and various changes can be made without departing from the spirit of the present invention.

As described above, the planar illumination device according to the embodiments includes a light source substrate, a lens, a diffuser, and a spacer. The light source substrate includes a plurality of light-emitting devices two-dimensionally arrayed thereon. Light emitted from the light source substrate enters the lens. The light is then output from the lens and enters the diffuser. The spacer is integrally formed with the diffuser and arranged between the lens and the diffuser. This structure facilitates design and production of the product, while meeting an increasing demand for narrower frames.

The spacer includes a plate-like projection extending toward the lens from a side located at an end of the diffuser. This structure allows the spacer to easily have a required stiffness.

The spacer includes a rod-shaped projection extending toward the lens from a side located at an end of the diffuser or from a flat portion of the diffuser. This structure allows the spacer to easily have a required stiffness.

The planar illumination device includes a light source substrate, a lens, a diffuser, and a spacer. The light source substrate includes a plurality of light-emitting devices two-dimensionally arrayed thereon. Light emitted from the light source substrate enters the lens. The light is then output from the lens and enter the diffuser. The spacer is integrally formed with the lens and arranged between the lens and the diffuser. This structure facilitates design and production of the product, while meeting an increasing demand for narrower frames.

The spacer includes a plate-like projection extending toward the diffuser from a side located at an end of the lens. This structure allows the spacer to easily have a required stiffness.

The spacer includes a rod-shaped projection extending toward the diffuser from a side located at an end of the lens or from a flat portion of the lens. This structure allows the spacer to easily have a required stiffness.

The location of the rod-shaped projection is inconsistent with the location directly above the light-emitting device. This structure can make the luminance more uniform.

The rod-shaped projection is arranged in the middle of four light-emitting devices vertically and horizontally adjacent to one another. This structure can make the luminance more uniform.

The rod-shaped projection is arranged in the middle of two light-emitting devices vertically or horizontally adjacent to each other. This structure can make the luminance more uniform.

Furthermore, the planar illumination device includes a grating reflector including reflection surfaces surrounding a light-emitting device. This structure can enhance the optical characteristics.

The above embodiments are not intended to limit the present invention, and the present invention includes a structure in which the above-described components are combined with one another as appropriate. Additional effects and modifications can be easily conceived of by the skilled person. A broader aspect of the present invention is therefore not limited to the above-described embodiments, and various changes can be made.

REFERENCE SIGNS LIST

1 BACKLIGHT
12 LED SUBSTRATE
12a LED
14 LENS
14a PROJECTION
15 DIFFUSER
15a, 15c to 15e PROJECTION

The invention claimed is:

1. A planar illumination device, comprising:
a light source substrate including a plurality of two-dimensionally arrayed light-emitting devices;
a lens configured to receive light emitted from the light source substrate, the lens having small prisms arrayed on a surface thereof and configured to control distribution of light;
a diffuser configured to receive light emitted from the lens; and
a spacer integrated with the lens, arranged between the lens and the diffuser, the spacer having a front end contacting the diffuser and creating a certain amount of gap between the lens and the diffuser, and the lens and the spacer are integrally formed of transparent material, the spacer is formed on a surface of the lens facing the diffuser, and the small prisms are arrayed on another surface of the lens opposite to the surface facing the diffuser.

2. The planar illumination device according to claim 1, wherein the spacer includes a plate-like projection extending along a side located at an end of the lens and extending from the side toward the diffuser.

3. The planar illumination device according to claim 2, wherein a color of an inner wall surface of the plate-like projection is different from a color of a body of the lens.

4. The planar illumination device according to claim 1, further comprising:
a grating reflector including a plurality of slanted reflection surfaces that surround an aperture in which each of the light-emitting devices is arranged.

5. The planar illumination device according to claim 1, wherein
the spacer includes a rod-shaped projection extending from a side located at an end of the lens or from a flat portion of the lens toward the diffuser, and
a location of the rod-shaped projection is inconsistent with a location directly above the light-emitting devices.

6. The planar illumination device according to claim 5, wherein the scale of the rod-shaped projection in the direction parallel to the flat portion of the lens is smaller than an interval between two light sources adjacent each other.

7. The planar illumination device according to claim 5, wherein a location of the rod-shaped projection is inconsistent with a location directly above the light-emitting devices.

8. The planar illumination device according to claim 7, wherein the rod-shaped projection is arranged in a middle of four light-emitting devices vertically and horizontally adjacent to one another.

9. The planar illumination device according to claim 7, wherein the rod-shaped projection is arranged in a middle of two light-emitting devices vertically or horizontally adjacent to each other.

* * * * *